(12) United States Patent
Higashino et al.

(10) Patent No.: US 6,448,687 B2
(45) Date of Patent: Sep. 10, 2002

(54) AUTOMOTIVE ALTERNATOR

(75) Inventors: Kyoko Higashino, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/738,318

(22) Filed: Dec. 18, 2000

(30) Foreign Application Priority Data

Apr. 14, 2000 (JP) .................................. 2000-113507

(51) Int. Cl.[7] .................................................. H02K 9/06
(52) U.S. Cl. ...................... 310/263; 310/60 R; 310/61
(58) Field of Search ..................... 310/263, 58, 68 D, 310/89, 62–63, 254, 216; 29/596–598

(56) References Cited

U.S. PATENT DOCUMENTS

| | | | | |
|---|---|---|---|---|
| 4,184,804 A | * | 1/1980 | Inagaki et al. | 310/62 |
| 4,492,885 A | * | 1/1985 | Kitamura et al. | 310/62 |
| 4,565,936 A | * | 1/1986 | Ikegami et al. | 310/43 |
| 4,684,324 A | * | 8/1987 | Perosino | 416/189 |
| 4,757,221 A | * | 7/1988 | Kurihashi et al. | 310/62 |
| 4,838,760 A | * | 6/1989 | Brackett | 416/93 R |
| 5,021,696 A | * | 6/1991 | Nelson | 310/62 |
| 5,235,229 A | * | 8/1993 | Tanaka et al. | 310/62 |
| 5,325,003 A | * | 6/1994 | Saval et al. | 310/43 |
| 5,625,244 A | * | 4/1997 | Bradfield | 310/71 |
| 5,705,865 A | * | 1/1998 | Ishida et al. | 310/62 |

FOREIGN PATENT DOCUMENTS

JP 11-220851 8/1999

* cited by examiner

Primary Examiner—Tran Nguyen
(74) Attorney, Agent, or Firm—Sughrue Mion, PLLC

(57) ABSTRACT

In an automotive alternator having a case in which air intake vents $1a$ and air discharge vents $1b$ are disposed, a rotor, which is fastened to a shaft such that claw-shaped magnetic poles intermesh, has as a pair of fans having a plurality of blades and fastened to the axial end surfaces of poles cores, and is rotatably disposed in the case, a stator core to which a plurality of slots are formed and a stator having a stator winding to be accommodated in the slots, the slots are formed in an even number, each of the claw-shaped magnetic poles is formed in an even number, and said blades of the pair of fans are formed in the same odd number, respectively. With this construction, there can be provided a small automotive alternator which has a high output and an excellent cost performance and in which fans generate a low level of noise.

8 Claims, 20 Drawing Sheets

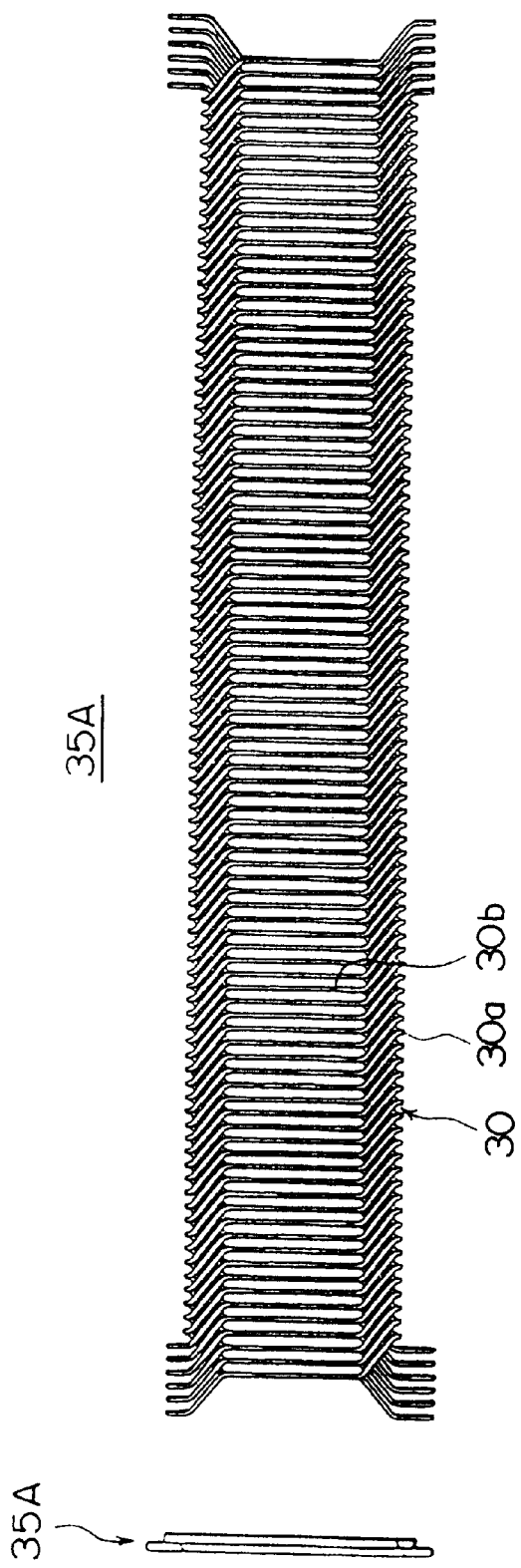

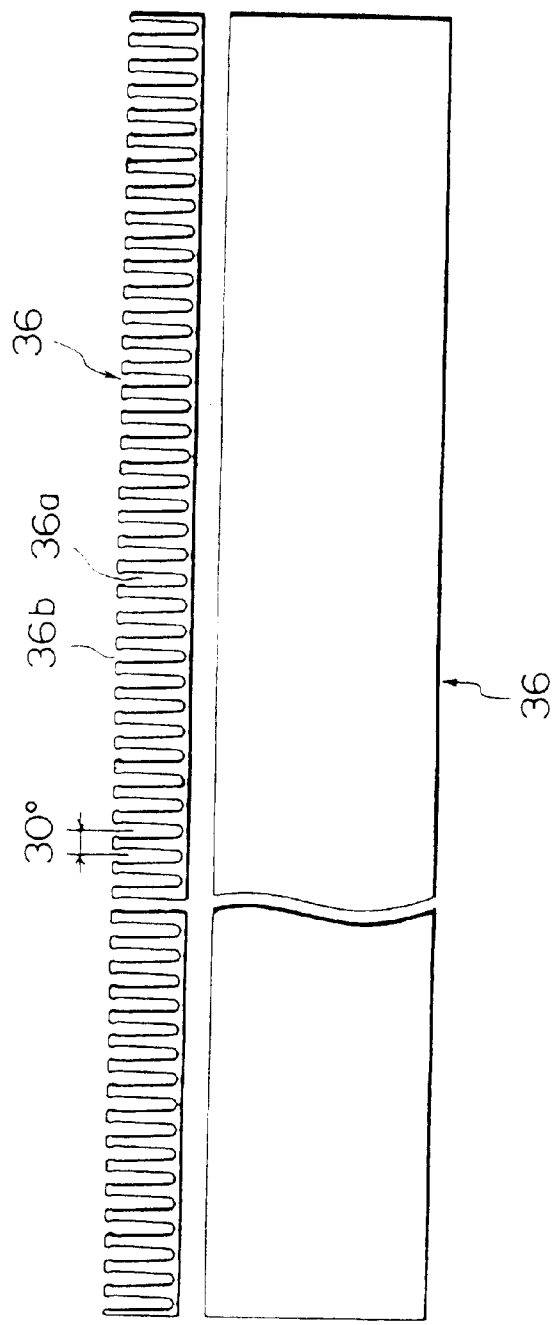

A > B

ØE > ØF

AUTOMOTIVE ALTERNATOR

BACKGROUND OF THE INVENTION

1. Field of the Invention

The present invention relates to a vehicle-mounted automotive alternator, and more particularly, to the number of blades of fans mounted on a rotor.

2. Description of the Related Art

FIG. 24 is a sectional view showing a construction of an ordinary automotive alternator. FIG. 25 is a perspective view of a rotor shown in FIG. 24.

The automotive alternator is arranged such that a Lundell-type rotor 7 is rotatably mounted in a case 3 composed of an aluminum front bracket 1 and an aluminum rear bracket 2 through a shaft 6, and a stator 8 is fastened to the inner wall surface of the case 3 so as to cover the inner circumference of the rotor 7.

The shaft 6 is rotatably supported by the front bracket 1 and the rear bracket 2. A pulley 4 is fastened to an end of the shaft 6 so as to transmit the rotational torque of an engine to the shaft 6 through a belt (not shown).

Slip rings 9 are fastened to the other end of the shaft 6 to supply current to the rotor 7 and a pair of brushes 10 are accommodated in a brush holder 11 disposed in the case 3 so as to be in sliding contact with the slip rings 9. A regulator 18 is adhered to a heat sink 17 fitted to the brush holder 11 to regulate the magnitude of AC voltage generated by the stator 8. Rectifiers 12, which are electrically connected to the stator 8, are mounted in the case 3 to rectify alternate current generated by the stator 8 to direct current.

The rotor 7 includes a rotor coil 13 for generating magnetic flux on passage of electric current and a pair of pole cores 20 and 21 disposed so as to cover the rotor coil 13, magnetic poles being formed in the pole cores 20 and 21 by magnetic flux generated in the rotor coil 13. The pair of poles cores 20 and 21 are made of iron and have cylindrical core base portions 22a and 23a and a plurality of claw-shaped magnetic poles 22 and 23 disposed radially externally on the outer circumferential perimeters of the core base portions 22a and 23a at even pitch, respectively, the end surfaces of the core base portions 22a and 23a are abutted against each other, and the pole cores 20 and 21 are fastened to the shaft 6 facing each other such that the claw-shaped magnetic poles 22 and 23 intermesh.

Fans 5, each having a plurality of blades 5c in the vicinity of the outer circumference thereof, are mounted on the end surfaces of the cylindrical core base portions 22a and 23a at both the ends of the rotor 7 to be driven in the axial direction thereof. Each fan 5 has a thin base sheet 5a and the plurality of blades 5c formed by cutting and raising the base sheet 5a.

The stator 8 includes a stator core 15, and a stator coil 16 from which alternate current is generated by the change of magnetic flux from the rotor 7 as the rotor 7 rotates, the stator coil 16 being composed of a conductive wire wound around the stator core 15.

In the automotive alternator constructed in this manner, current is supplied from a battery (not shown) to the rotor coil 13 by means of the brushes 10 and the slip rings 9, and the magnetic flux is generated. The claw-shaped magnetic poles of one pole core 20 are magnetized to N polarities by the magnetic flux, and the claw-shaped magnetic poles 23 of the other pole core 21 are magnetized to S polarities. On the other hand, the rotational torque of the engine is transmitted to the shaft 6 by means of the belt and the pulley 4, and the rotor 7 is rotated. Thus, a rotating magnetic field is imparted to the stator coil 16, and electromotive force is generated in the stator coil 16. This alternating electromotive force is rectified to direct current by means of the rectifiers 12, its voltage is regulated by the regulator 18, and the battery is recharged.

In the automotive alternator, the rotor coil 13, the stator coil 16, the rectifiers 12, and the regulator 18 generate heat at all time while power is generated. To cool heat generated by the power generation, air intake vents 1a and 2a and air discharge vents 1b and 2b are disposed in the front bracket 1 and the rear bracket 2.

As shown by an arrow in FIG. 24, at a rear-end, external air is sucked into the case 3 through the air intake vents 2a by means of the rotation of a fan 5 and cools the rectifiers 12 and the regulator 18, then cools the rear-end coil end of the stator coil 16 by being deflected centrifugally by the fan 5, and thereafter is discharged to the outside from the air discharge vents 2b.

As shown by an arrow in FIG. 24, at a front-end, external air is sucked into the case 3 through the air intake vents 1a by the rotation of a fan 5, cools the front-end coil end of the stator coil 16 by being deflected centrifugally by the fan 5, and thereafter is discharged to the outside from the air discharge vents 1b. Further, cooling wind generated by a pressure difference between the front-end and the rear-end flows from the front-end to the rear-end through the inside of the rotor 7, and cools the rotor coil 13.

In general, automotive alternators, which are auxiliary machines mounted on vehicles, are required to have a performance to cope with the requirement for reducing noise outside vehicle and for making compartment quiet. The alternator includes a rotating member rotating at the large number of rotation at all times, which causes a problem of wind noise and magnetic noise. Further, the alternator, which is a heating member, is increasingly put in thermally hostile environments by the reduction of a space in which equipment are mounted. When, for example, the capacity of the fans 5 as a cooling means is increased to cope with the above problem, noise caused by the fans 5 may be increased. Further, when the cooling property of the alternator is reduced, an output of the alternator is decreased.

As a method of solving the above problem, Japanese Unexamined Patent Application Publication No. 11-220851 discloses to prevent an increase in noise by making the number of blades of fans 5 smaller than the number of claw-shaped magnetic poles. That is, the method prevents noise caused by the vibration of the claw-shaped magnetic poles when they rotate from being synchronized with noise caused by fan blades 5c.

Incidentally, there is provided the even number of claw-shaped magnetic poles to alternately form N-poles and S-poles. Therefore, when the even number of fan blades 5c is used at any one of a front-end and a rear-end, they include the number of resonance which is resonated with the number of the claw-shaped magnetic poles. Particularly, in an automotive alternator whose frequency of rotation has a considerably wide range, it is a problem that the above method does not act as a perfect countermeasure for suppressing interference noise.

SUMMARY OF THE INVENTION

Accordingly, it is an object of the present invention, which was made to solve the above problems, to provide a small automotive alternator having a high output and excellent in a cost performance without reducing the cooling property thereof even at high environmental temperature.

In an automotive alternator according to the present invention including a case having a plurality of air intake vents disposed in the axial surface thereof and a plurality of air discharge vents disposed in the radial surface thereof, a rotor having a pair of pole cores including claw-shaped magnetic poles projecting radially externally from the outer circumferential perimeters thereof at even pitch, respectively, fastened to a shaft such that the claw-shaped magnetic poles intermesh and rotatably disposed in the case, the pair of pole cores having a pair of fans, which include a plurality of blades around the outer circumferences thereof, and being fastened to the axial end surfaces thereof; and a stator fastened to the case so as to cover the outer circumference of the rotor, and having a stator core including a plurality of slots formed around the inner circumference thereof facing the rotor and a stator winding accommodated in the slots, the slots are formed in an even number, each of the claw-shaped magnetic poles is formed in an even number, and the blades of the pair of fans are formed in the same odd number, respectively.

The number of the fan blades may be less than one-half the total number of the pair of claw-shaped magnetic poles.

Parts to be cooled are housed in the case at a rear-end and the amount of wind generated by a fan at a front-end may be larger than the amount of wind generated by a fan at the rear-end.

The outlet angle of the fan at the front-end may be larger than the outlet angle of the fan at the rear-end.

The outside diameter of the fan at the front-end may be larger than the outside diameter of the fan at the rear-end.

Further, the stator winding may include a plurality of windings in each of which one strand of wire is bent back outside the slots at the end surfaces of the stator core and wound into wave winding so as to alternately occupy an inner layer and an outer layer in a slot depth direction within the slots a predetermined number of slots apart, and the strand of wire bent back outside the slots at the end surfaces of the stator core may be arranged in a circumferential direction, thereby constituting coil end groups having approximately the same shape.

Further, the stator winding may include a plurality of windings in each of which one long strand of wire is bent back outside the slots at the end surfaces of the stator core and wound into wave winding so as to alternately occupy an inner layer and an outer layer in a slot depth direction within the slots a predetermined number of slots apart, and the turned portions of the strand of wire bent back outside the slots at the end surfaces of the stator core may be arranged in the circumferential direction, thereby constituting coil end groups, the coils ends having approximately the same shape at said front-end and at the rear-end.

Further, the number of the slots may be set to two in each pole and in each phase.

BRIEF DESCRIPTION OF THE DRAWINGS

FIGS. 10A and 10B are a side elevational view and a plan view, respectively showing one of strand of wire groups on an inner layer side constituting part of the stator winding used in the automotive alternator;

FIG. 14A and FIG. 14B are a side elevational view and a rear elevational view, respectively explaining the construction of a stator core used in the automotive alternator;

DESCRIPTION OF THE PREFERRED EMBODIMENTS

Embodiment 1

Figure 1:
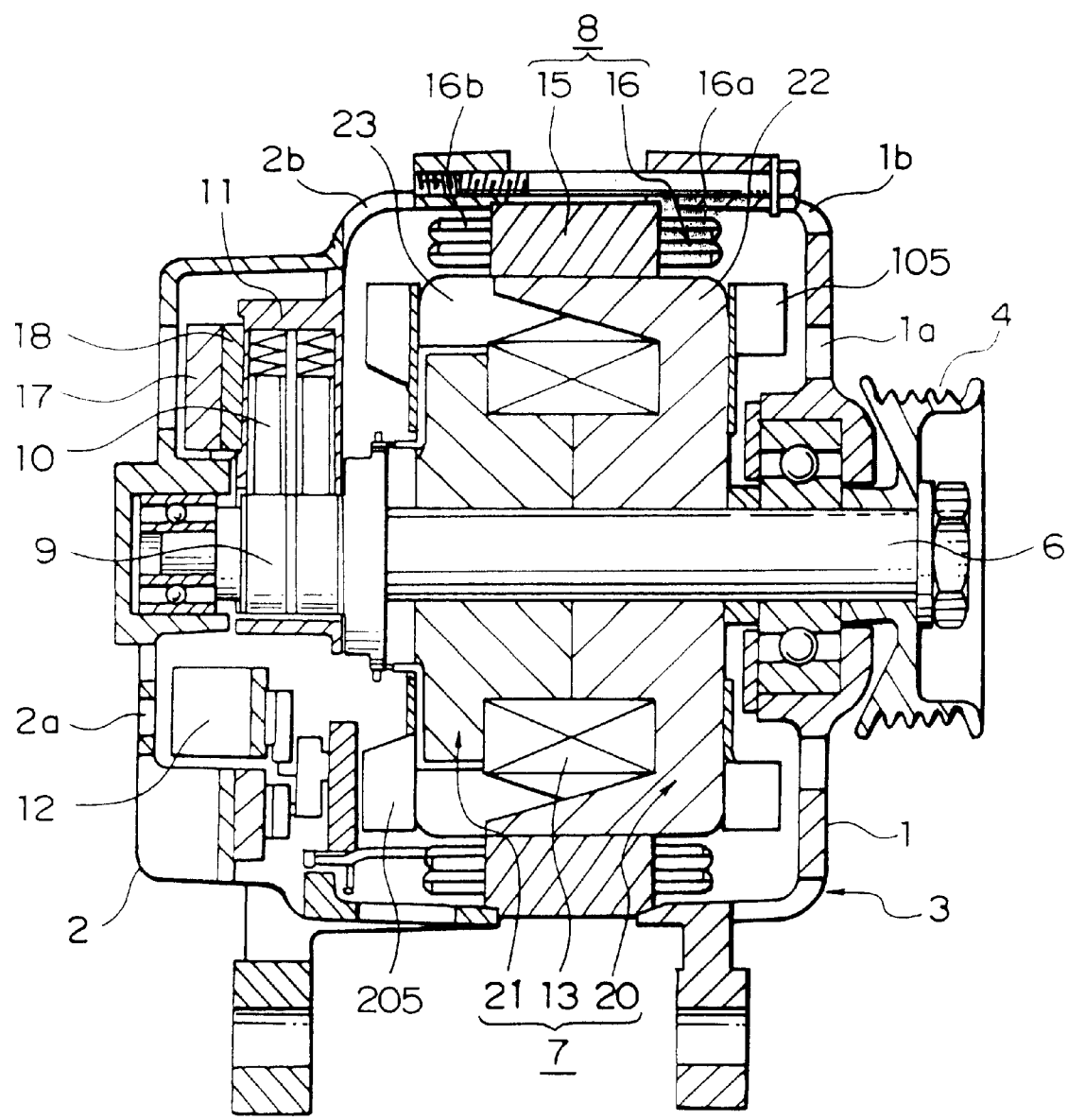
FIG. 1 is a sectional view showing a construction of an automotive alternator according to an embodiment 1 of the present invention.
Figure 2:
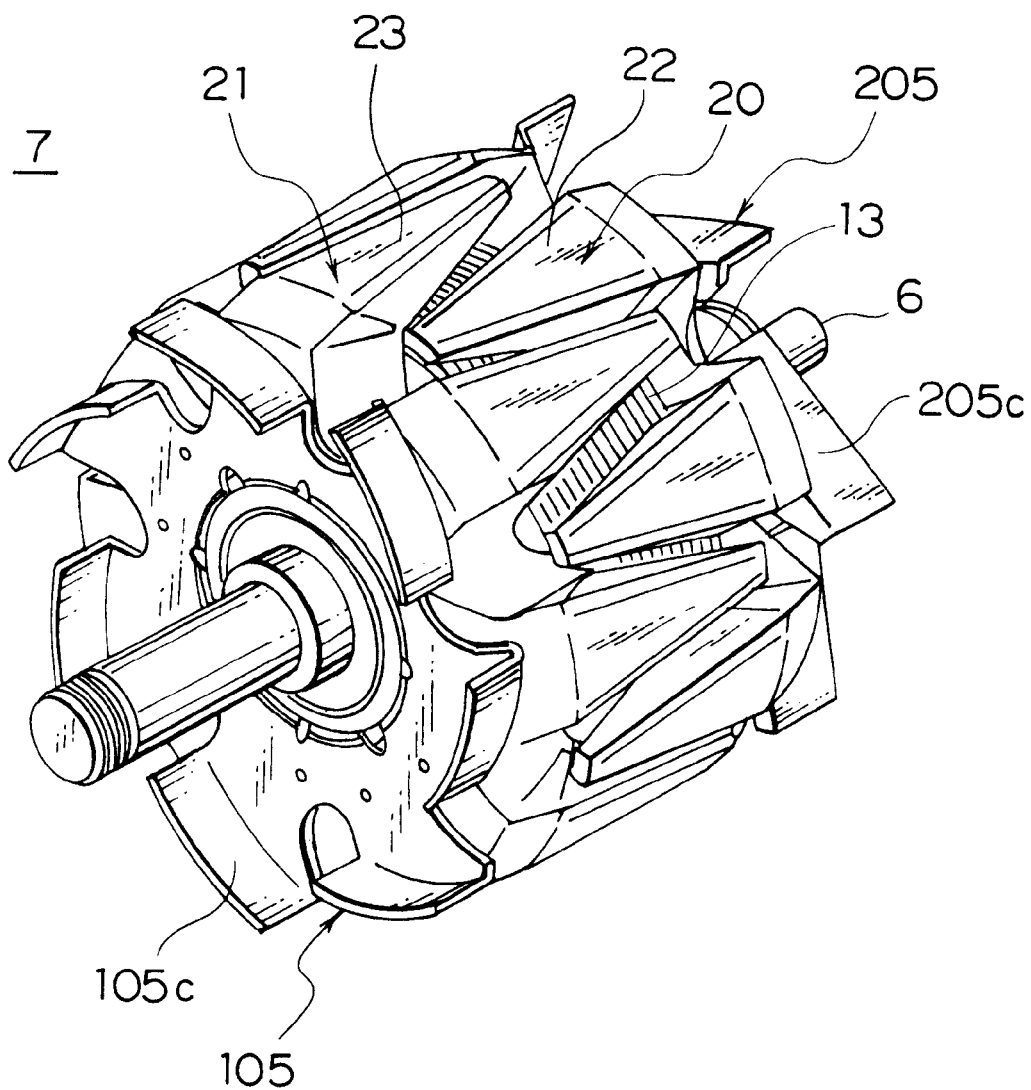
FIG. 2 is a perspective view of a rotor shown in FIG. 1.
Figure 3:
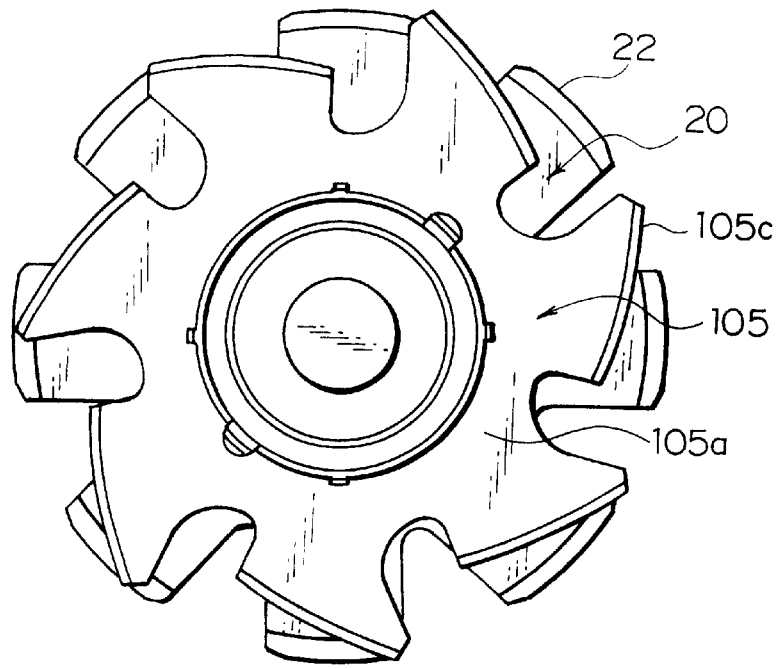
FIG. 3 is a plan view the rotor of FIG. 1 when it is viewed from a front-end.
Figure 4:
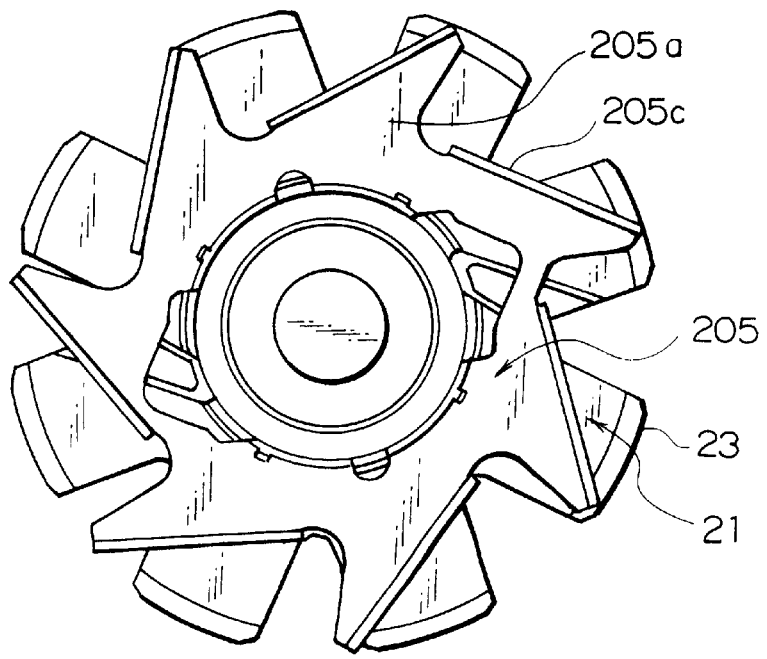
FIG. 4 is a plan view of the rotor of FIG. 1 when it is viewed from a rear-end.
Figure 5:
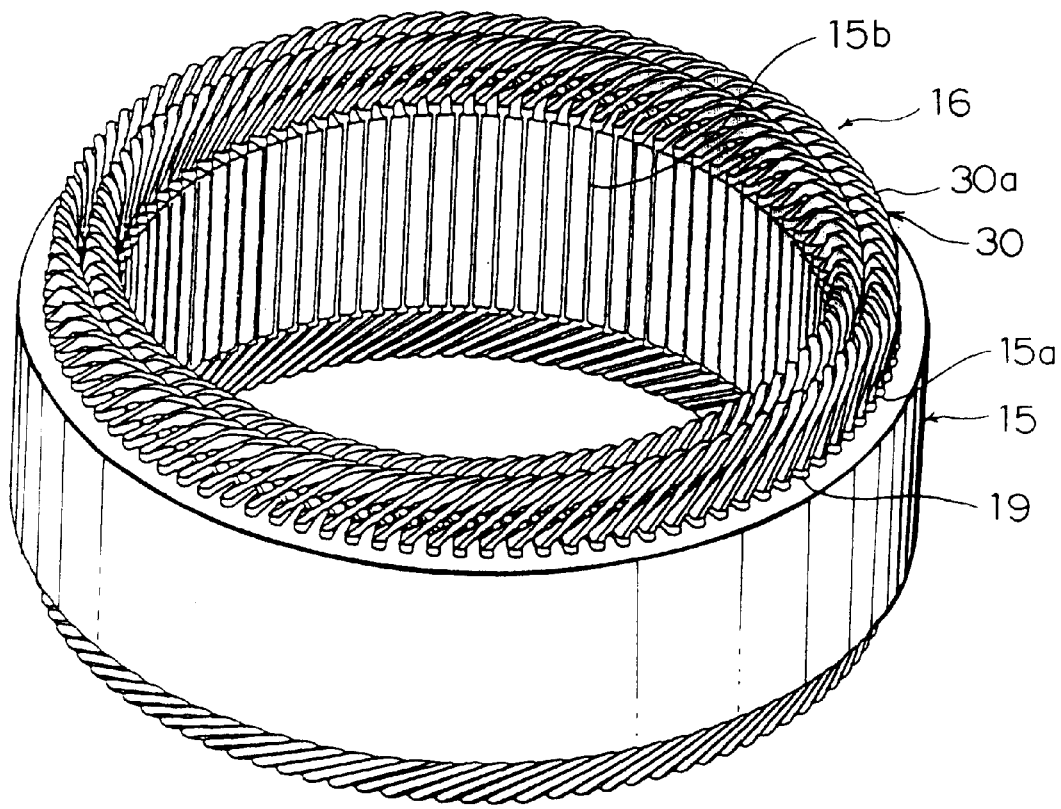
FIG. 5 is a perspective view showing a stator of the automotive alternator.
Figure 6:
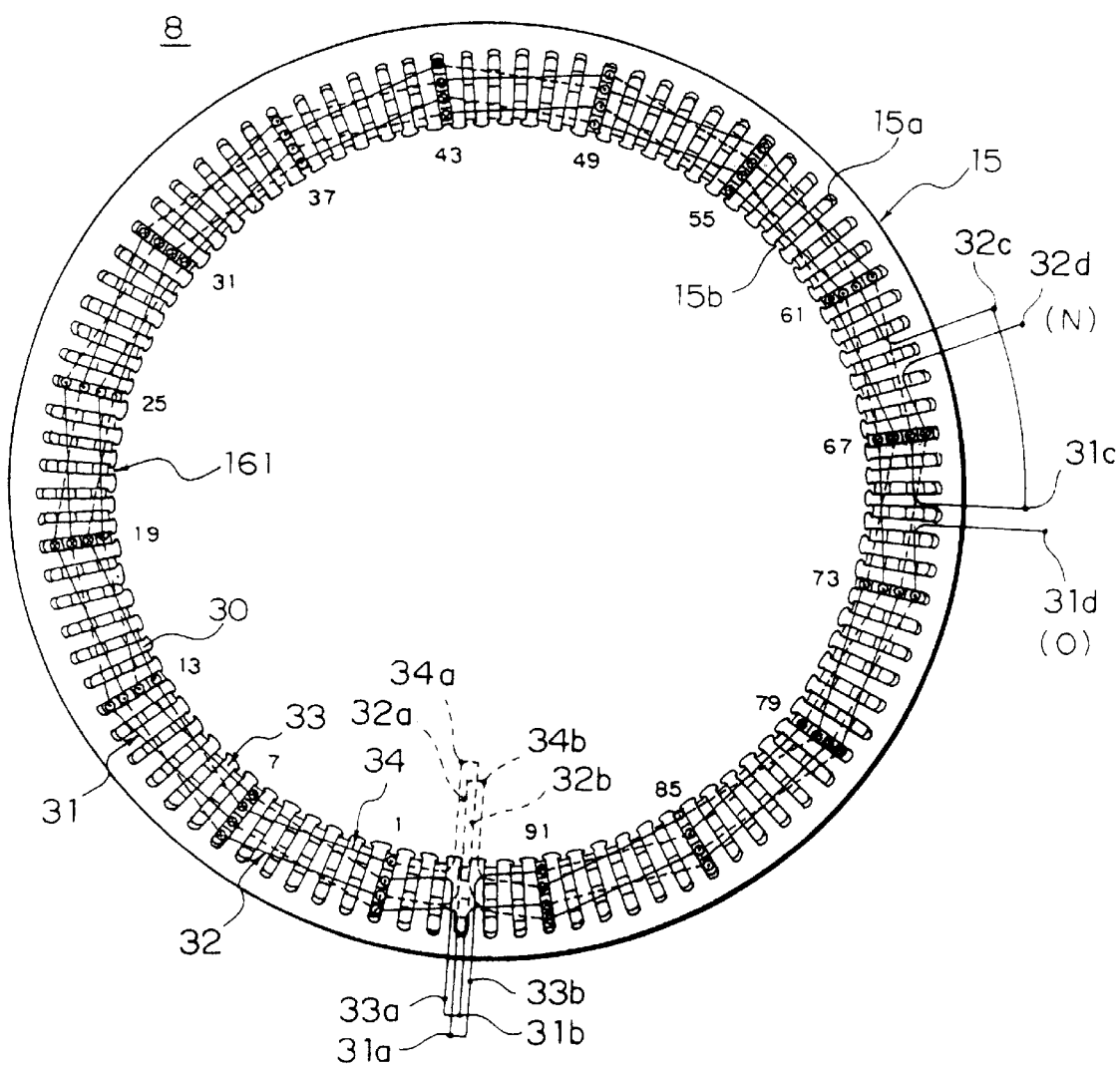
FIG. 6 is a plan view explaining connections in one stator winding phase portion in the automotive alternator.
Figure 7:
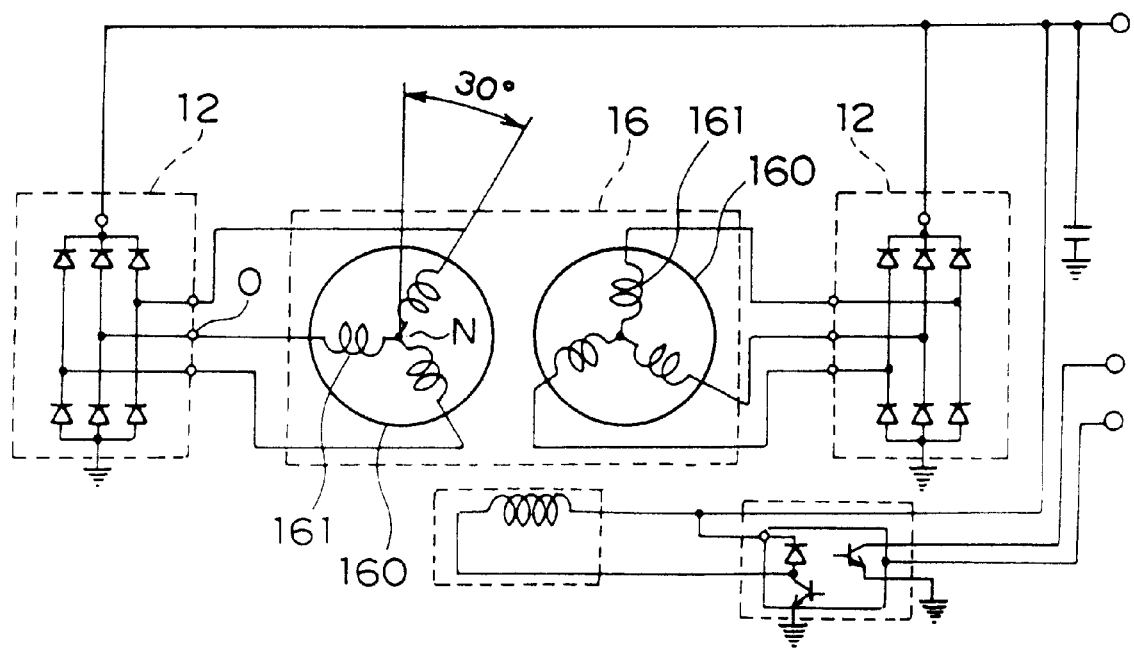
FIG. 7 is a circuit diagram of the automotive alternator.

FIG. 1 is a sectional view showing a construction of an automotive alternator according to an embodiment 1 of the present invention; FIG. 2 is a perspective view of a rotor shown in FIG. 1; FIG. 3 is a plan view the rotor of FIG. 1 when it is viewed from a front-end; FIG. 4 is a plan view of the rotor of FIG. 1 when it is viewed from a rear-end; FIG. 5 is a perspective view showing a stator of the automotive alternator; FIG. 6 is a plan view explaining connections in one stator winding phase portion in the automotive alternator; and FIG. 7 is a circuit diagram of the automotive alternator.

Figure 8:
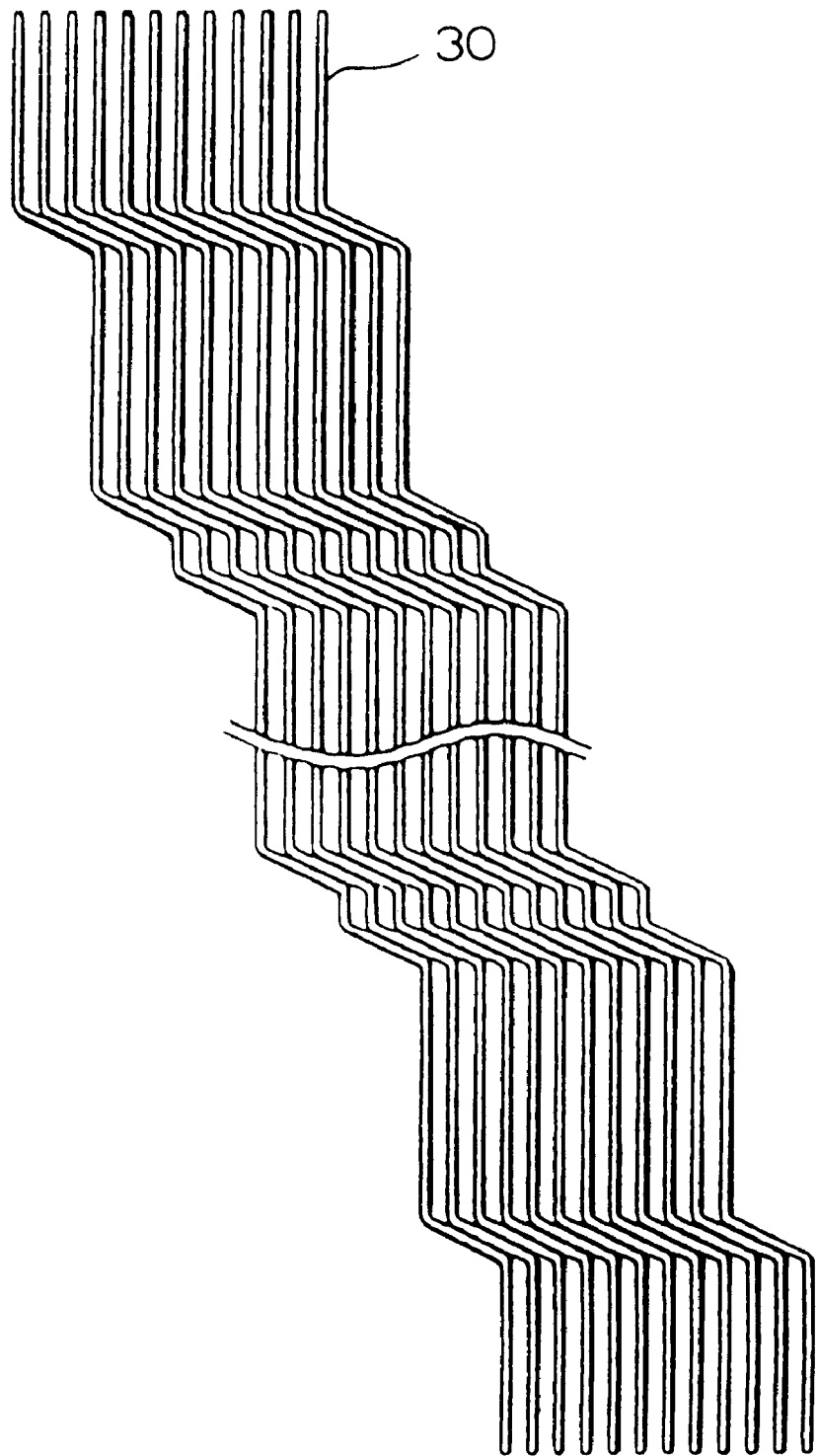
FIG. 8 is a view explaining a process for manufacturing a winding group constituting a stator winding used in the automotive alternator.
Figure 9:
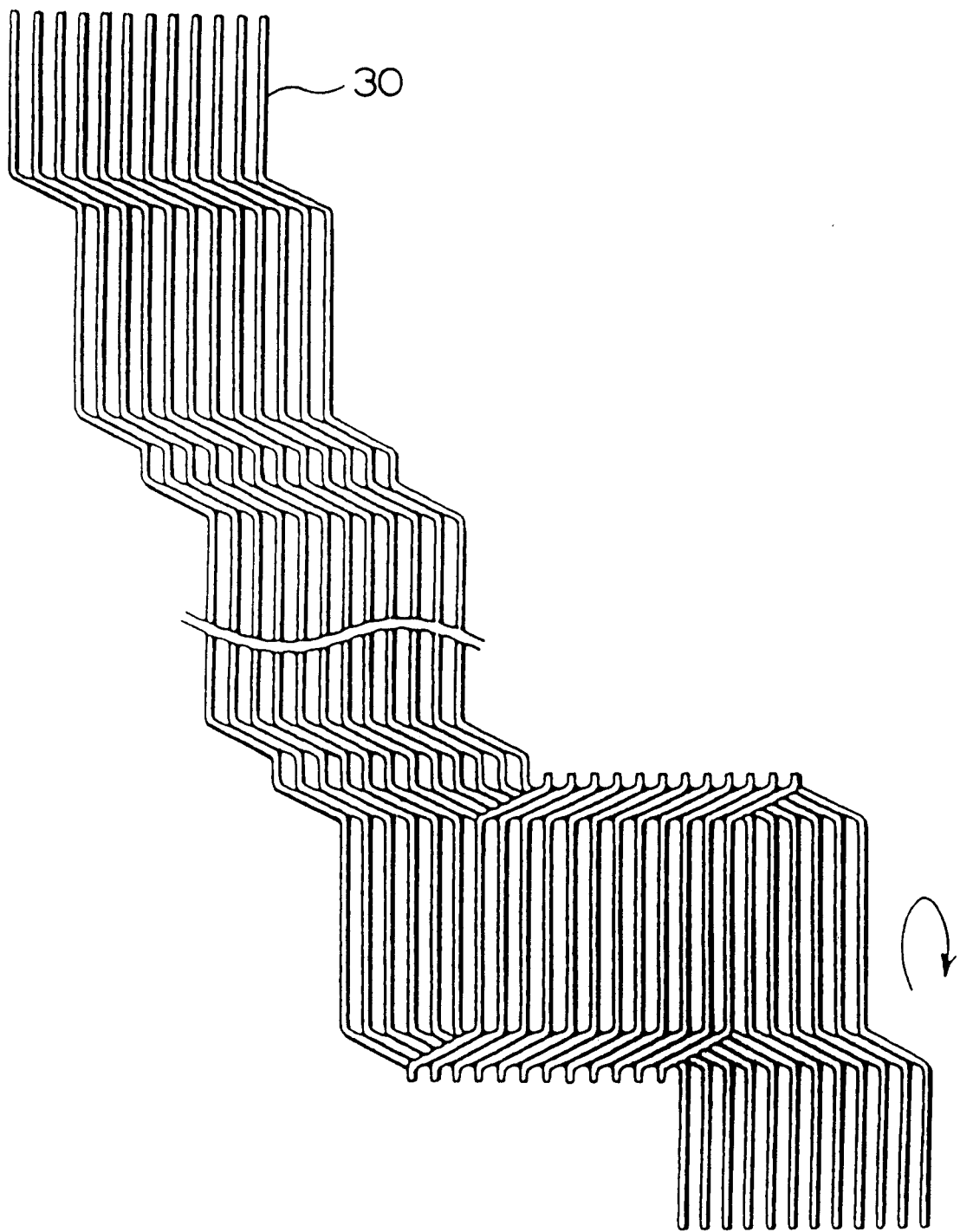
FIG. 9 is a diagram explaining the manufacturing process for the winding groups constituting part of the stator winding used in the automotive alternator.
Figures 11A, 11B:
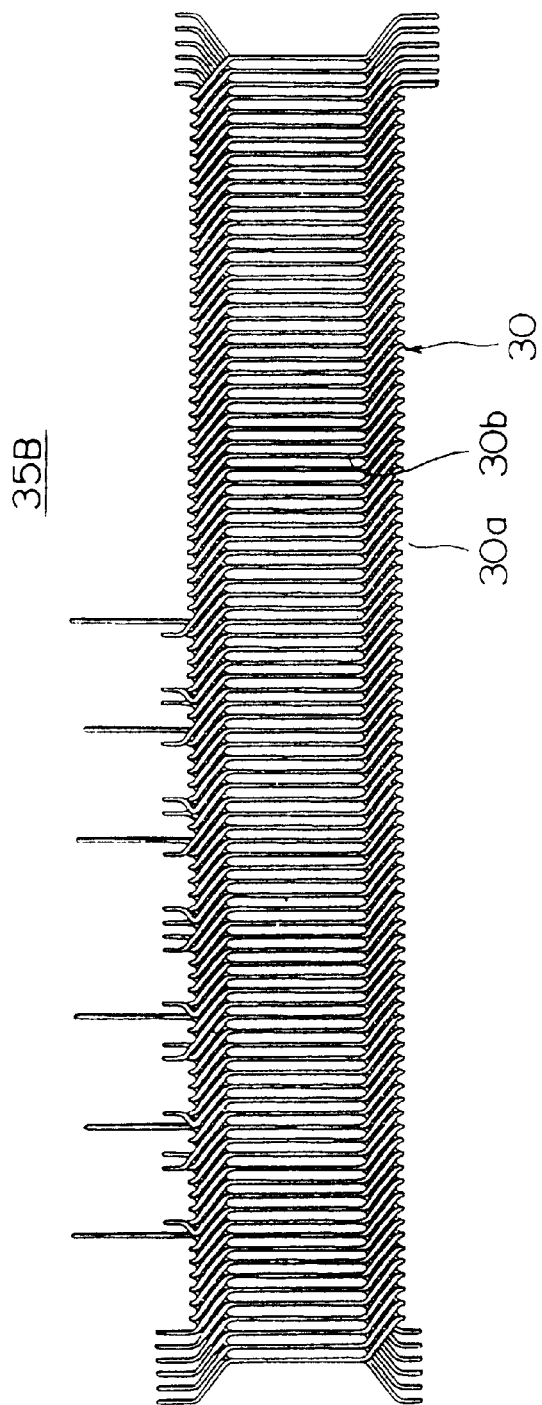
FIG. 11A and FIG. 11B are a side elevational view and a plan view, respectively showing one of strand of wire groups on an outer layer side constituting part of the stator winding used in the automotive alternator.
Figure 12:
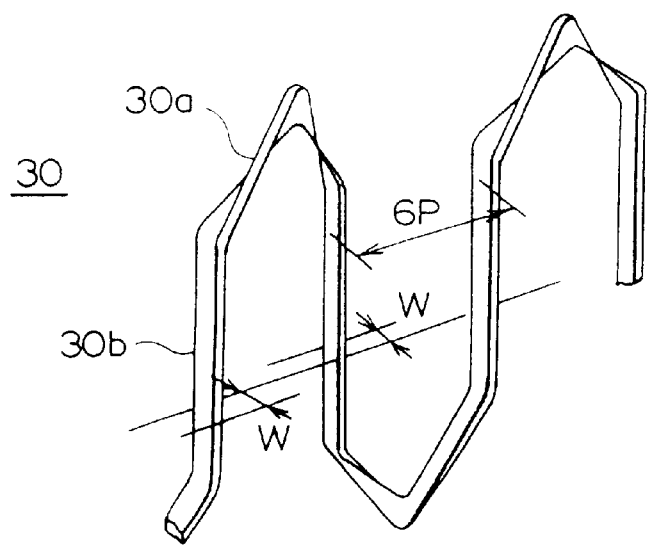
FIG. 12 is a perspective view showing the main portion of strands of wire constituting the stator winding used in the automotive alternator.
Figure 13:
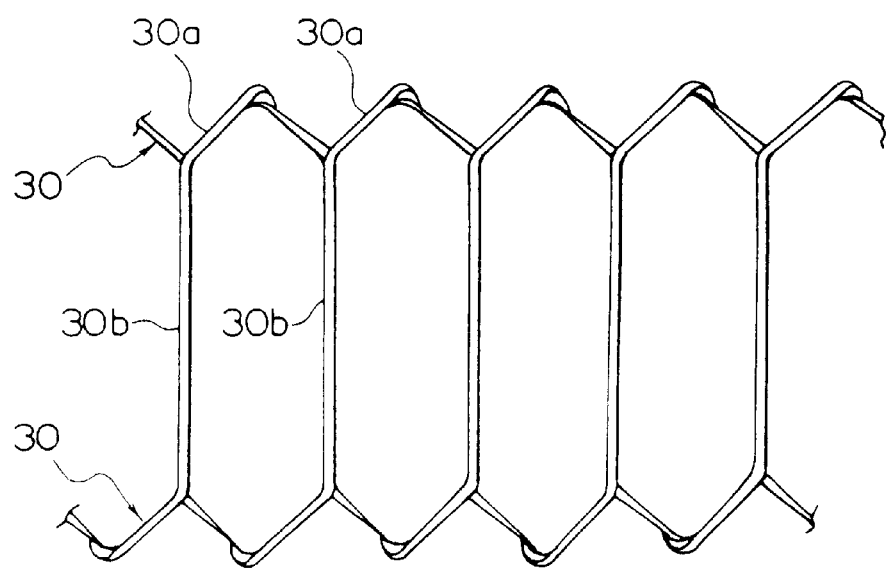
FIG. 13 is a diagram explaining arrangement of the strands of wire constituting part of the stator winding used in the automotive alternator.
Figure 16:
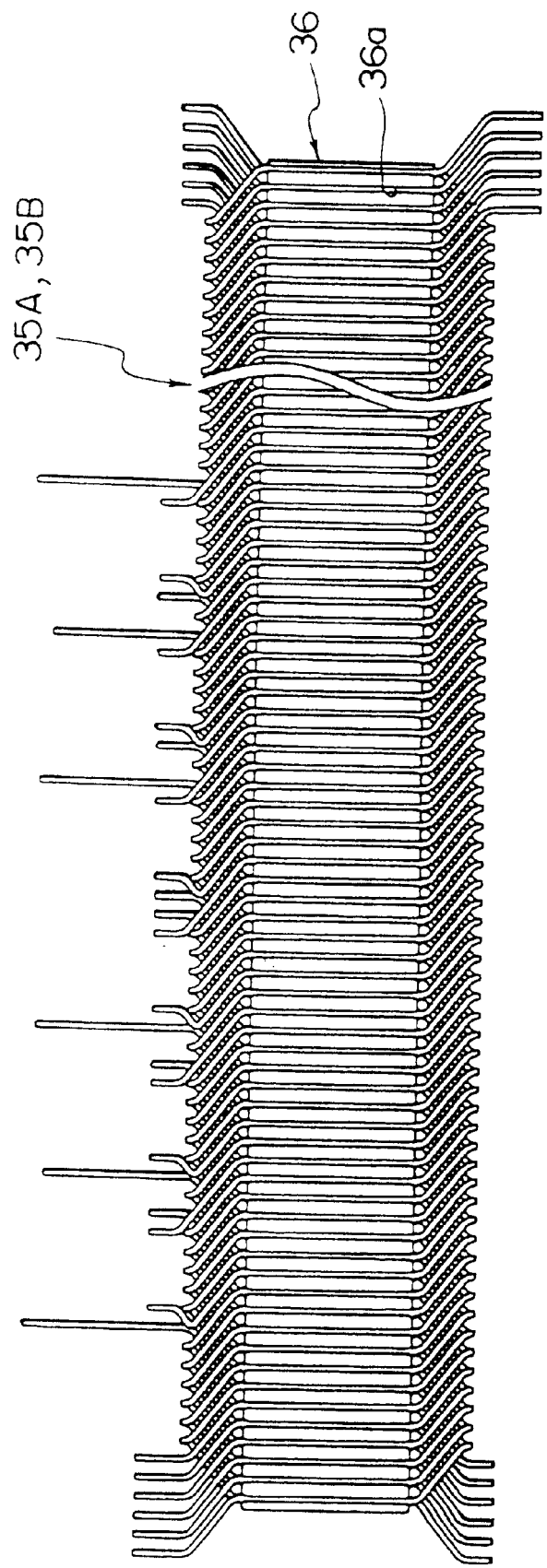
FIG. 16 is a plan view showing how one of the strand of wire groups constituting the stator winding used in the automotive alternator is mounted on the stator core.
Figure 17:
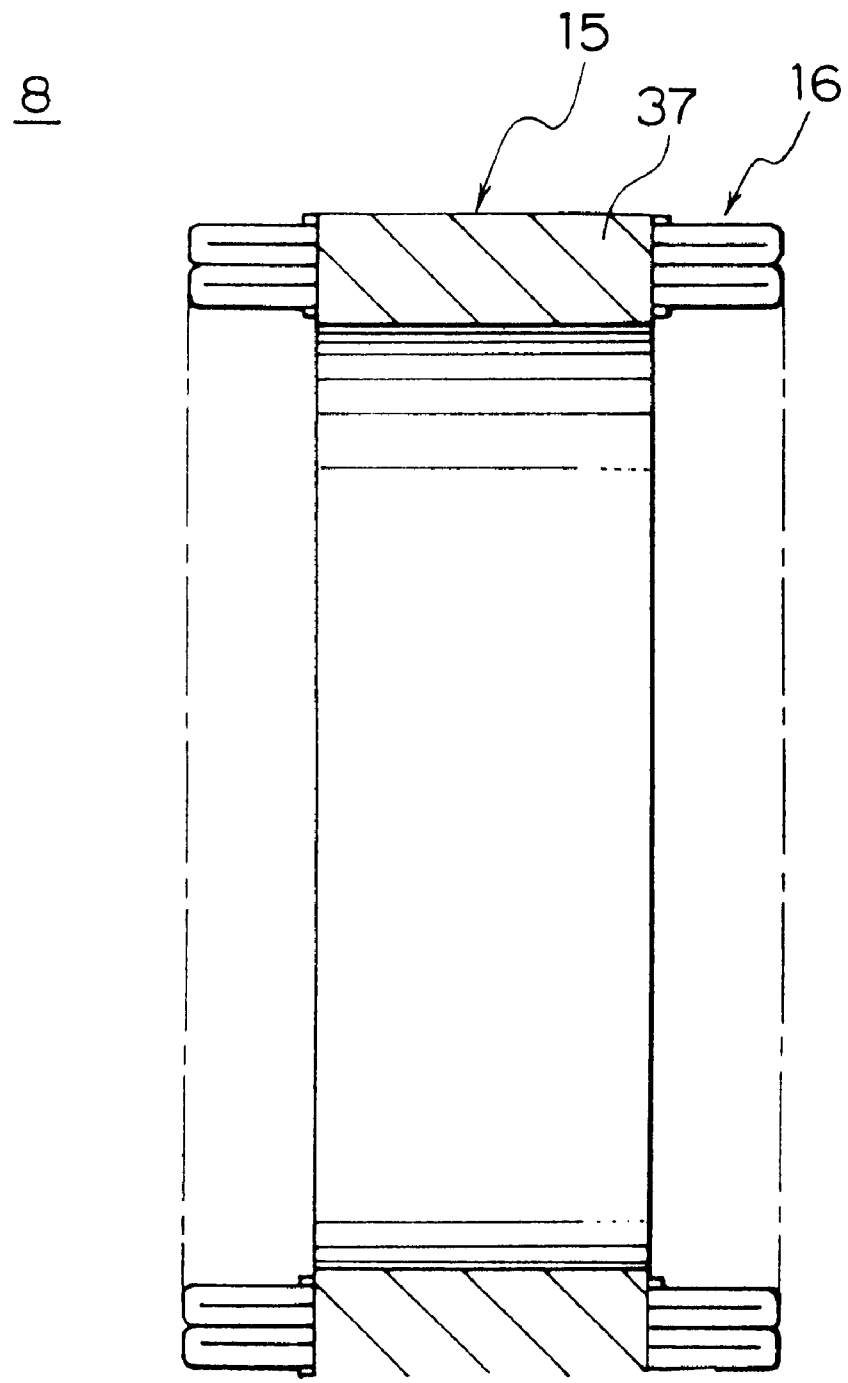
FIG. 17 is a sectional view of the stator used in the automotive alternator.

FIGS. 8 and 9 are diagrams explaining the manufacturing process for the winding groups constituting part of the stator winding used in the automotive alternator; FIGS. 10A and 10B are a side elevational view and a plan view, respectively showing one of strand of wire groups on an inner layer side constituting part of the stator winding used in the automotive alternator; FIG. 11A and FIG. 11B are a side elevational view and a plan view, respectively showing one of strand of wire groups on an outer layer side constituting part of the stator winding used in the automotive alternator; FIG. 12 is a perspective view showing the main portion of strands of wire constituting the stator winding used in the automotive alternator; FIG. 13 is a diagram explaining arrangement of the strands of wire constituting part of the stator winding used in the automotive alternator; FIG. 14A and FIG. 14B are a side elevational view and a rear elevational view, respectively explaining the construction of a stator core used in the automotive alternator; FIG. 15 is a cross sectional view explaining the manufacturing process for a stator used in the automotive alternator; FIG. 16 is a plan view showing how one of the strand of wire groups constituting the stator winding used in the automotive alternator is mounted on the stator core; and FIG. 17 is a sectional view of the stator used in the automotive alternator. Note that output wires and crossover connections are omitted in FIG. 5.

In FIGS. 1 and 2, the automotive alternator is arranged such that a Lundell-type rotor 7 is rotatably mounted in a case 3 composed of an aluminum front bracket 1 and an aluminum rear bracket 2 through a shaft 6, and a stator 8 is fastened to the inner wall surface of the case 3 so as to cover the inner circumference of the rotor 7.

The shaft 6 is rotatably supported by the front bracket 1 and the rear bracket 2. A pulley 4 is fastened to an end of the shaft 6 so as to transmit the rotational torque of an engine to the shaft 6 through a belt (not shown).

Slip rings 9 are fastened to the other end of the shaft 6 to supply current to the rotor 7 and a pair of brushes 10 are accommodated in a brush holder 11 disposed in the case 3 so as to be in sliding contact with the slip rings 9. A regulator 18 is adhered to a heat sink 17 fitted to the brush holder 11 to regulate the magnitude of the alternating voltage generated by the stator 8. Rectifiers 12, which are electrically connected to the stator 8, are mounted in the case 3 to rectify alternate current generated by the stator 8 to direct current.

Further, air intake vents 1a and 2a are disposed in the axial end surfaces of the front bracket 1 and the rear bracket 2, and air discharge vents 1b and 2b are disposed in the two outer circumferential shoulder portions of the front bracket 1 and the rear bracket 2, opposite the radial outside of the front-end and rear-end coil ends 16 and 16b of the stator winding 16.

In FIG. 2, the rotor 7 includes a rotor coil 13 for generating magnetic flux on passage of electric current and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron and have eight claw-shaped magnetic poles 22 and 23 disposed on the outer circumferential perimeters thereof at even pitch in a circumferential direction so as to project axially, respectively, and the pole cores 20 and 21 are fastened to the shaft 6 facing each other such that the claw-shaped magnetic poles 22 and 23 intermesh. That is, the rotor 7 includes eight poles cores on each side, namely, it has sixteen (16) claw-shaped magnetic poles in total. A fan 105 is fastened to the front-end end surface of the rotor 7, whereas a fan 205 is fastened to the rear-end end surface of the rotor 7.

In FIG. 3, the front-end fan 105 is composed of a thin metal sheet and includes an annular fan base portion 105a and curved blades 105c formed by cutting and raising a plurality of edges extending from the outer circumferential edge section of the fan base portion 105a radially outwardly. The fans 105 is projection welded in state that fan base portion 105a is abutted against an end surface of the pole core 20.

In FIG. 4, the rear-end fan 205 is composed of a thin metal sheet similarly to the front-end fan 105 and includes an annular fan base portion 205a and flat blades 205c formed by cutting and raising a plurality of edges extending from the outer circumferential edge section of the fan base portion 205 radially outwardly. The fan 205 is projection welded in the state that the fan base portion 205a is abutted against an end surface of the pole core 21.

In the above construction, the number of the blades of each of the fans 105 and 205 is set to seven as an odd number which is smaller than eight which is one-half sixteen, that is, the total number of the magnetic poles obtained by adding the number of the claw-shaped magnetic poles 22 of the pole core 20 and the number of the claw-shaped magnetic poles 23 of the pole core 21.

As shown in FIG. 5, the stator 8 includes: a cylindrical stator core 15 composed of a laminated core formed with a number of slots 15a extending longitudinally at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes a plurality of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Next, the winding construction of one phase of a stator winding group 161 will be explained in detail with reference to FIG. 6.

One phase of the stator winding group 161 is composed of first to fourth winding sub-portions 31 to 34 each formed from one strand of wire 30. The first winding sub-portion 31 is formed by wave winding one strand of wire 30 into every sixth slot from slot number is 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of the stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, a second cut end 31d of the first winding sub-portion 31 and a second cut end 32d of the second winding sub-portion 32 become an lead wire (O) and a neutral-point lead wire (N), respectively.

Six phases of stator winding groups 161 are similarly formed by offsetting the slots 15a into which the strands of wire 30 are wound one slot at a time. Then, as shown in FIG. 7, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Now, the strands of wire 30 constituting the first to fourth winding b-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil-end portions 16a and 16b.

Next, how the stator 8 is assembled will be explained with reference to FIGS. 8 to 14.

First, as shown in FIG. 8, twelve long strands of wire 30 are simultaneously bent in the same plane to form a lightning-bolt shape. Then, a wire-strand group 35A, shown in FIG. 10, is prepared by progressively folding the strand at right angles, as indicated by the arrow in FIG. 9, using a jig. In addition, a wire-strand group 35B including bridging connections and lead wires, as shown in FIG. 11, is prepared in a similar manner. The wire-strand groups 35A and 35B are then annealed for ten minutes at 300° C. so that a parallelepiped core 36 mounted with the wire-strand groups 35A and 35B can be easily formed into an annular shape.

Moreover, as shown in FIG. 12, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 13. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

The parallelepiped core 36 is prepared as shown in FIG. 14 by laminating a predetermined number of sheets of SPCC material formed with trapezoidal slots 36a at a predetermined pitch (an electrical angle of 30°) and laser welding an outer portion thereof.

Figure 15A:
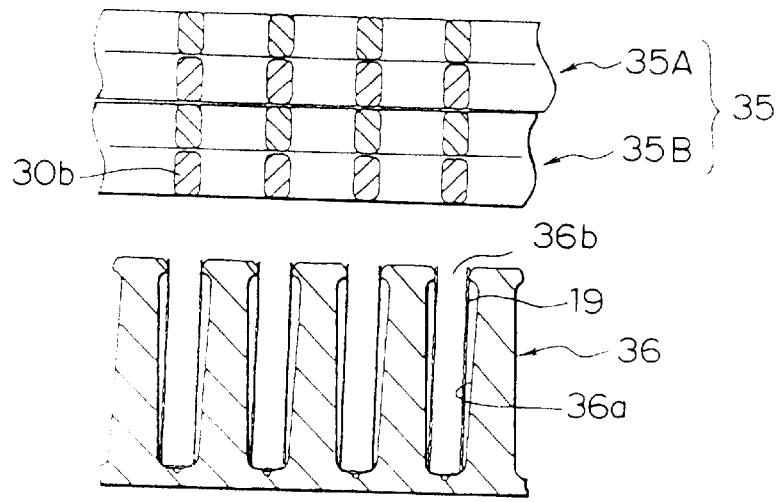
FIG. 15 is a cross sectional view explaining the manufacturing process for a stator used in the automotive alternator.
Figure 15B:
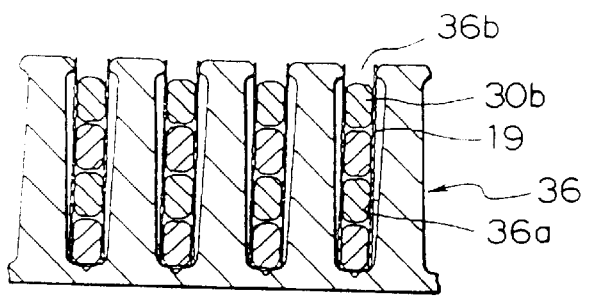
Figure 15C:
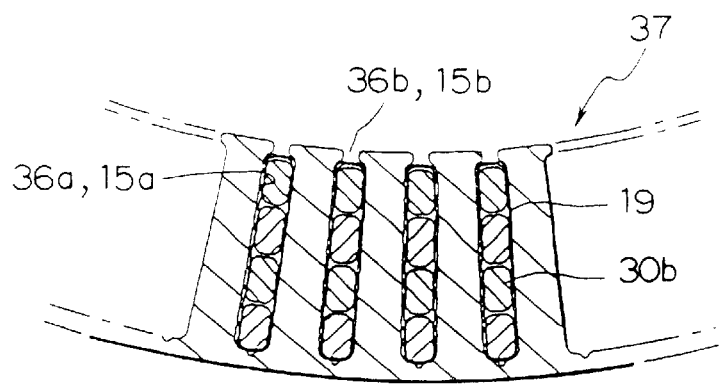

As shown in FIG. 15A, the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG. 15B. At this time, straight portions 30b of the strands of wire 30 are housed in lines of four in the radial direction within the slots 36a and are electrically insulated from the parallelepiped core 36 by the insulators 19. The two wire-strand groups 35A and 35B are stacked one on top of the other when installed in the parallelepiped core 36 as shown in FIG. 16.

Next, the parallelepiped core 36 is rolled up and its ends abutted and welded to each other to obtain a cylindrical core 37, as shown in FIG. 12C. By rolling up the parallelepiped core 36, the slots 36a (corresponding to the slots 15a in the stator core) take on a generally rectangular cross-sectional shape, and vent portions 36b of the slots 36a (corresponding to vent portions 15b of the slots 15a) become smaller than the slot-width dimensions of the straight portions 30b. Then, the end portions of each of the strands of wire 30 are connected to each other based on the connections shown in FIG. 6 to form stator winding groups 161.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles thereby. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is rectified to direct current, the magnitude of the current is regulated by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fan 205, flowing along the axis of the shaft 6, cooling the rectifiers 12 and the regulator 18, and is then deflected centrifugally by the fan 205, cooling the rear-end coil end group 16b of the polyphase stator winding 16 before being expelled to the outside through the air discharge vents 2b. At the same time, at the front end, external air is drawn in axially through the air intake vents 1a by rotation of the fan 105, and is then deflected centrifugally by the fan 105, cooling the front-end coil end group 16a of the polyphase stator winding 16 before being expelled to the outside through the air discharge vents 1b.

As described above, according to the embodiment, in the automotive alternator including the case 3 having the plurality of air intake vents 1a disposed in the axial surface thereof and the plurality of air discharge vents 1b disposed in the radial surface thereof, the rotor 7 having the pair of pole cores 20, 21 including the claw-shaped magnetic poles 22, 23 projecting radially externally from the outer circumferential perimeters thereof at even pitch, respectively, fastened to the shaft 6 such that the claw-shaped magnetic poles 22, 23 intermesh and rotatably disposed in the case 3, the pair of pole cores 20, 21 having a pair of fans 105 and 205, which include the plurality of blades 105c and 205c around the outer circumferences thereof, and being fastened to the axial end surfaces thereof; and the stator 8 fastened to the case 3 so as to cover the outer circumference of the rotor 7, and having the stator core 15 including the plurality of slots 15a formed around the inner circumference thereof facing the rotor 7 and the stator winding 10 accommodated in the slots 15a, the slots 15a are formed in an even number, each of the claw-shaped magnetic poles is formed in an even number, and the blades 105c and 205c of the pair of fans 105 and 205 are formed in the same odd number, respectively.

As a result, vibration of the claw-shaped magnetic poles 23 themselves which is generated when the rotor 7 rotates is not synchronized with vibration of each of the fans 105 and 205 which are fastened to the claw-shaped magnetic poles 22 and 23 and have the blades 105c and 205 and project axially and noise can be reduced thereby. Further, the front and rear-end blades 105c and 205c are not synchronized with the claw-shaped magnetic poles 22 and 23, respectively because the number of the front-end blades 105c is the same as the number of the rear-end blades 205c, by which noise can be more reduced. Furthermore, noises, which are caused by the blades 105c and 205c when they deliver air, are prevented from having an individually different frequency forward and rearward of the blades.

Further, the number of the fan blades 105c and 205c are less than one-half the total number of the pair of claw-shaped magnetic poles 22 and 23 (the number obtained by adding the number of the claw-shaped magnetic poles 22 and the number of the claw-shaped magnetic poles 23). As a result, the number of the blades 105c and 205c is reduced, permitting the areas of the respective blades 105c and 205c to be relatively improved. With this construction, the cooling capability of the fans 105 and 205 can be increased. That is, the numbers of the blades 105c and 205c of the embodiment are the same at the front-end and the rear-end and the same number is seven (7). Namely, the number of each blade is set to an odd number smaller than eight, that is, one-half the total number of the magnetic poles of sixteen (16), the odd number (7) being not too small without reducing the cooling property of the overall construction of the device.

Further, the stator winding 16 includes the plurality of windings 31 to 34 in each of which the one strand of wire 30 is bent back outside the slots 15a at the end surfaces of the stator core 15 and wound into the wave winding so as to alternately occupy the inner layer and the outer layer in the slot depth direction within the slots 15a a predetermined number of slots 15a apart, and the strand of wire 30 bent back outside the slots 15a at the end surfaces of the stator coil 16 is arranged in the circumferential direction, thereby constituting the coil end groups 16a and 16b which have approximately the same shape. Accordingly, a coil end portion, which is arranged neatly over the entire circumference, is formed, which reduces a ventilation resistance, improves the cooling property, and improves wind noise.

The stator winding 16a includes the plurality of windings 31 to 34 in each of which the one long strand of wire 30 is bent back outside the slots 15a at the end surfaces of the stator core 15 and wound into the wave winding so as to alternately occupy the inner layer and the outer layer in the slot depth direction within the slots 15a a predetermined number of slots 15a apart, and the turned portion of the strand of wire 30 bent back outside the slots 15a at the end surfaces of the stator core 15 is arranged in the circumferential direction, thereby constituting the coil end groups 16a and 16b, and the coil ends have approximately the same shape at the front-end and the rear-end. As a result, both the coil end groups 16a and 16b mare cooled in good balance, and the temperature of the stator winding is uniformly and greatly reduced. Further, the stator winding 16 equally interferes with the blades 105c and 205c at the front-end and the rear-end thereof so as to reduce interference noise.

In the embodiment, the number of slots 15a is set to two in each pole and in each phase. Thus, the number of the slots 15a is six times the number of the poles so that the frequency of vibration of the blades 105c and 205c is apart from the frequency of vibration of the claw-shaped magnetic poles 22 and 23, by which noise can be more dispersed and reduced. In addition, the number of the strands of wire 30 extending from the slots 15a is increased, and hence a noise reduction effect can be more increased.

Further, the strand of wire 30 constituting the inner circumferential sides of the coil ends 16a and 16b is inclined in parallel with each other, permitting an axial air flow in the case 3 to be turned along the inclination of the strand of wire 30. With this construction, the axial air flow generated by the rotation of the rotor 7 can be controlled.

That is, when the strand of wire 30 constituting the inner circumferential sides of the coil ends 16a and 16b is inclined in a direction which is obtained by combining the rotating directional component of the rotor 7 and the axis directional component of cooling wind, the cooling wind can be promoted to flow axially. With this construction, the rotor coil 13 is effectively cooled, by which the temperature of the rotor coil can be can be decreased, field current can be increased, and an increase in an output can be expected. In this case, the strand of wire 30 constituting the inner circumferential sides of the coil ends 16a and 16b is inclined along the axial flow component of cooling wind, thus wind noise due to interference can be also reduced.

On the other hand, when the strand of wire 30 constituting the inner circumferential sides of the coil ends 16a and 16b is inclined in the direction which is obtained by combining the rotating directional component of the rotor 7 and the axis directional component of cooling wind, the axial flow of cooling wind can be reduced. With this construction, the amount of wind on a discharge side is increased in the radial direction and the cooling property of the coil end disposed to the discharge side can be improved.

Note that the blades 105c are not necessarily cut and raised from the thin base sheet in parallel with the axis of the shaft 6. Further, the shape and the number of the air intake and discharge vents 1a and 1b and the positional relationship thereof to the stator winding 16 are not limited to the illustrated examples so long as they permit cooling wind from the blades 105c and 205c to flow smoothly.

Embodiment 2

Figure 18:
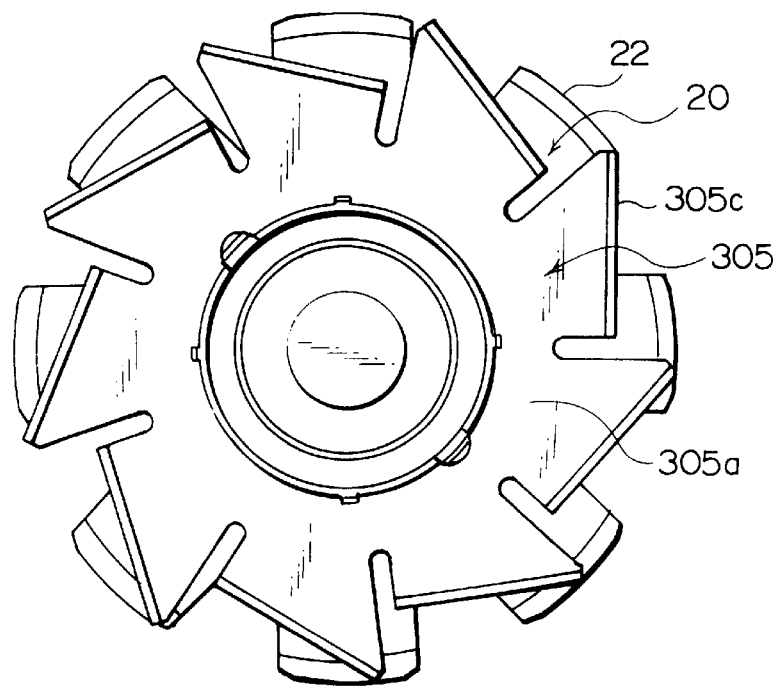
FIG. 18 is a plan view of a rotor of the automotive alternator according to a second embodiment of the present invention when it is viewed from a front-end.
Figure 19:
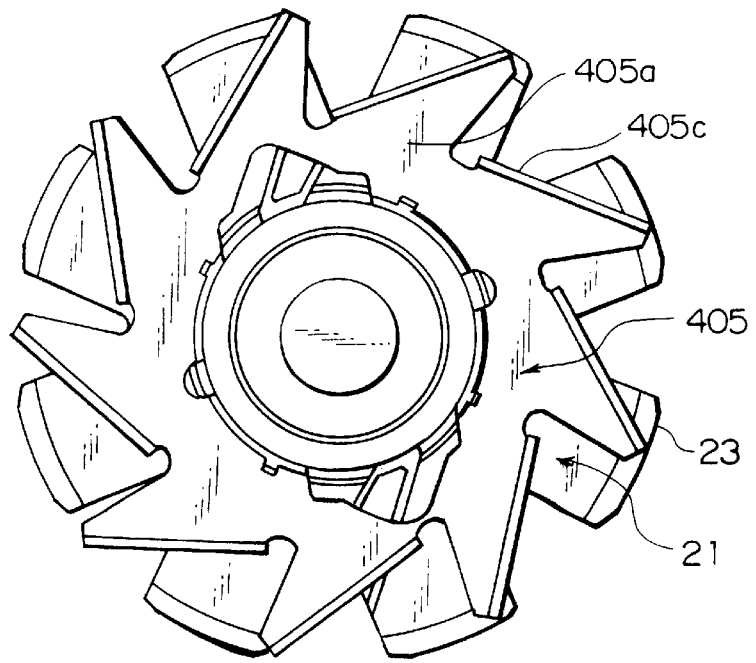
FIG. 19 is a plan view of the rotor when it is viewed from a rear-end.

FIG. 18 is a plan view of a rotor of the automotive alternator according to a second embodiment of the present invention when it is viewed from a front-end; and FIG. 19 is a plan view of the rotor when it is viewed from a rear-end.

In the embodiment, a fan 305 is fastened to the end surface of the rotor 7 at the front-end thereof, whereas a fan 405 is fastened to the end surface of the rotor 7 at the front-end thereof.

In FIG. 18, the front-end fan 305 composed of a thin metal sheet and includes an annular fan base portion 305a and curved blades 305c formed by cutting and raising a plurality of edges extending from the outer circumferential edge section of the fan base portion 305 radially outwardly. The fan 305 is projection welded in the state that it is abutted against an end surface of the pole core 20.

In FIG. 19, the rear-end fan 405 is composed of a thin metal sheet similarly to the fan 305 located at the front-end and includes an annular fan base portion 405a and flat blades 405c formed by cutting and raising a plurality of edges extending from the outer circumferential edge section of the fan base portion 405a radially outwardly. The fan 405 is projection welded in the state that it is abutted against an end surface of the pole core 21.

The number of the blades of each of the fans 305 and 405 is set to an odd number of nine (9) larger than eight (8), that is, one-half the total number of sixteen (16) of the magnetic poles obtained by adding the number of the claw-shaped magnetic poles 22 of the pole core 20 and the number of the claw-shaped magnetic poles 23 of the pole core 21.

As a result, vibration of the claw-shaped magnetic pole 22 and 23 themselves which is generated when the rotor 7 rotates is not synchronized with vibration of each of the fans 305 and 405 having the blades 305c and 405c which are fastened to the claw-shaped magnetic poles 22 and 23 and project axially, by which noise can be decreased. Further, the front and rear-end blades 305c and 405c are not synchronized with the claw-shaped magnetic poles 22 and 23, respectively because the number of the front-end blades 305c is the same as the number of the rear-end blades 405c, by which noise can be more decreased. Furthermore, noises, which are caused by the blades 105c and 205c when they deliver air, are prevented from being separately (alternately) generated forward and rearward of the blades.

Furthermore, the number of the fan blades 305c and 405 is larger than one-half the total number of the magnetic poles of a pair of the claw-shaped magnetic poles 22 and 23 (obtained by adding the numbers of both the claw-shaped magnetic poles 22 and 23). As a result, the cooling capabilities of the fans 305 and 405 can be improved.

Embodiment 3

Figure 20:
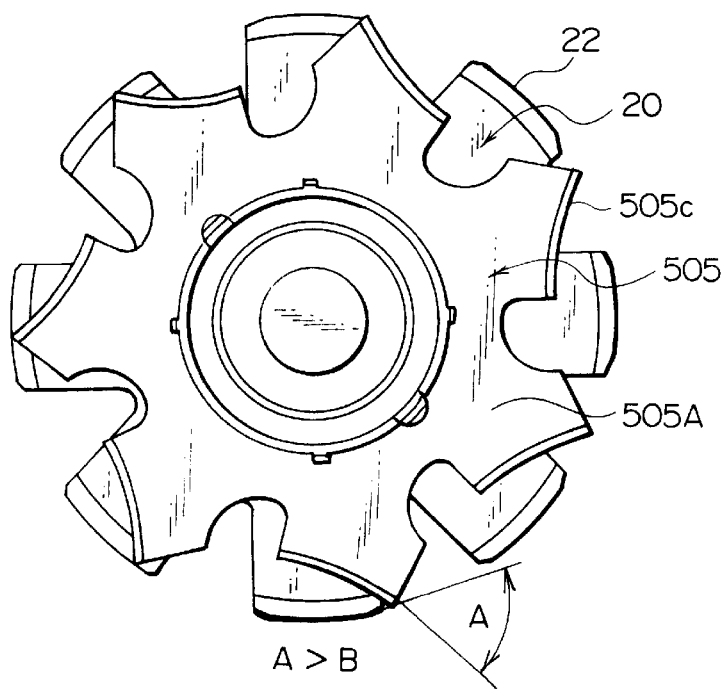
FIG. 20 is a plan view of a rotor of the automotive alternator according to a third embodiment of the present invention when it is viewed from a front-end.
Figure 21:
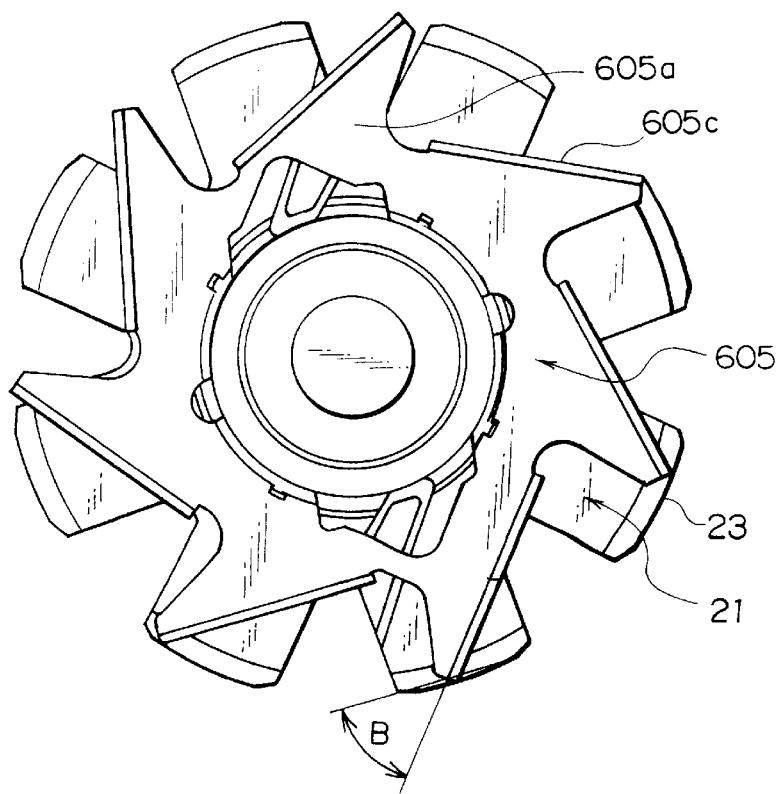
FIG. 21 is a plan view of the rotor when it is viewed from a rear-end.

FIG. 20 is a plan view of a rotor of the automotive alternator according to a third embodiment of the present invention when it is viewed from a front-end; and FIG. 21 is a plan view of the rotor when it is viewed from a rear-end.

In FIG. 20, a front-end fan 505 includes an annular fan base portion 505a and curved blades 505c formed by cutting and raising a plurality of edges extending from the outer circumferential edge section of the fan base portion 505a radially outwardly. Each of the blades 505c is formed to have a curved surface whose center of an arc is located externally of the blade.

In FIG. 21, a rear-end fan 605 includes an annular fan base portion 605a and flat blades 605c formed by cutting and raising a plurality of edges extending from the outer circumferential edge section of the fan base portion 605a radially outwardly, approximately similarly to the embodiment 1.

In the embodiment, as to an outlet angle between the outer circumferential end of each blade and the outer circumferential circle thereof, the outlet angle A of the front-end fan 505 is larger than the outlet angle B of the rear-end fan 606. An increase in the outlet angle B increases the amount of generated wind even if a blade has the same area. Therefore, in the embodiment, the amount of wind generated by the front-end fan 505 is larger than the amount wind generated by the rear-end fan 605.

In contrast, a wind path in the case 3 is narrow at the rear-end because internal parts to be cooled such as the rectifiers 12, the regulator 18 and the heat sinks 17 thereof are disposed in the case 3 at the rear-end, and hence a pressure loss is increased at the rear-end of the case 3. However, in the embodiment, the amount of wind generated by the front-end fan 505 is larger than the amount wind generated by the rear-end fan 605. Accordingly, the pressure loss of cooling wind at the front-end is made equal to the pressure loss of cooling wind at the rear-end, noises generated by the fans being made equal to each other at the front-end and at the rear-end.

Further, in the embodiment, the amount of wind generated by the front-end fan is made larger than the amount of wind generated by the rear-end fan by making the outlet angle A of the front-end fan 505 larger than the outlet angle B of the rear-end fan 605. With this construction, a difference between the amounts of wind can be realized by a simple construction.

Note that while each front-end blade 505c of the fan 505 has the curved surface whose center of arc is located externally of the blade, it may be formed to have a flat shape because the effect of the present invention can be obtained when the fan 505 has a large outlet angle A.

Embodiment 4

Figure 22:
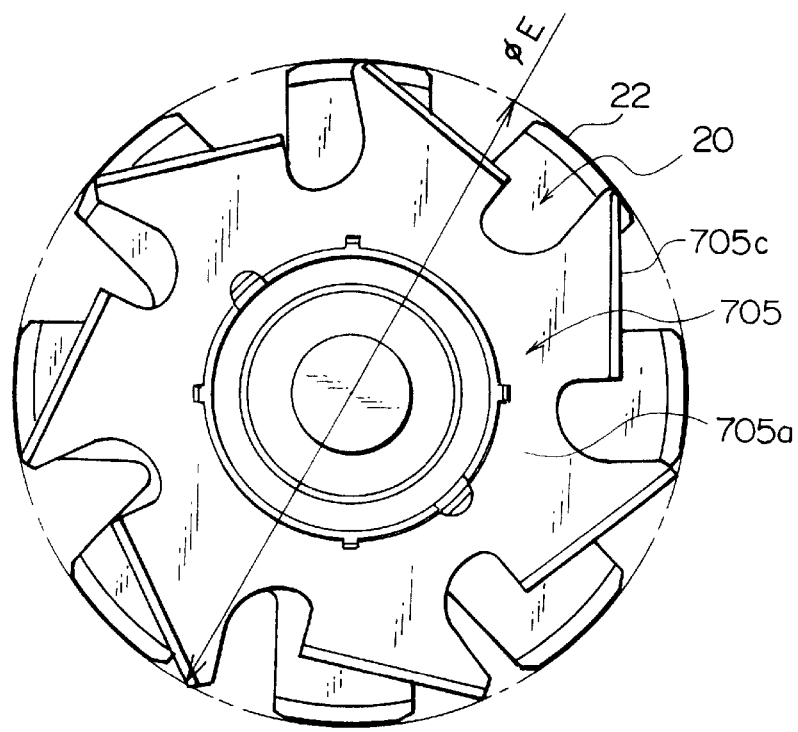
FIG. 22 is a plan view of a rotor of the automotive alternator according to a fourth embodiment of the present invention when it is viewed from a front-end.
Figure 23:
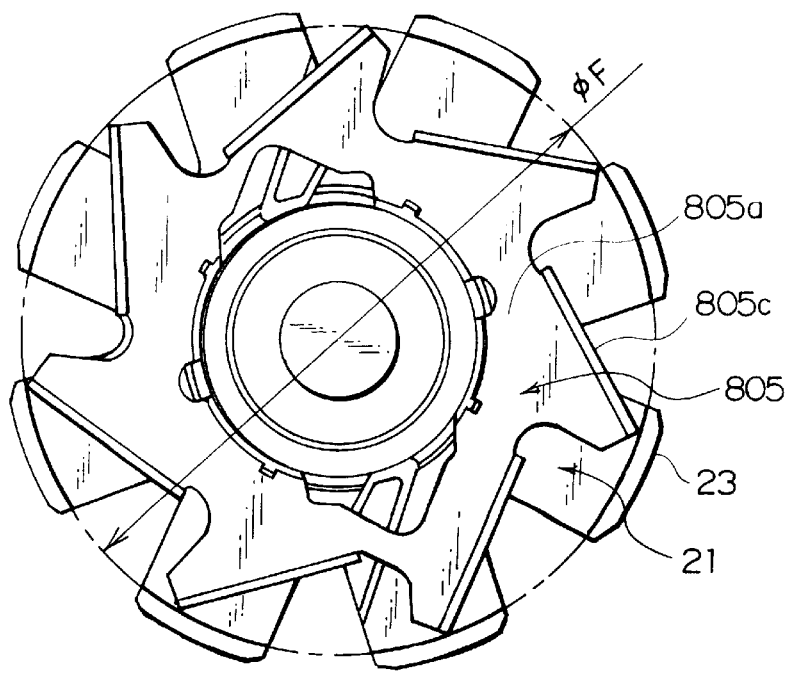
FIG. 23 is a plan view of the rotor when it is viewed from a rear-end.
Figure 24:
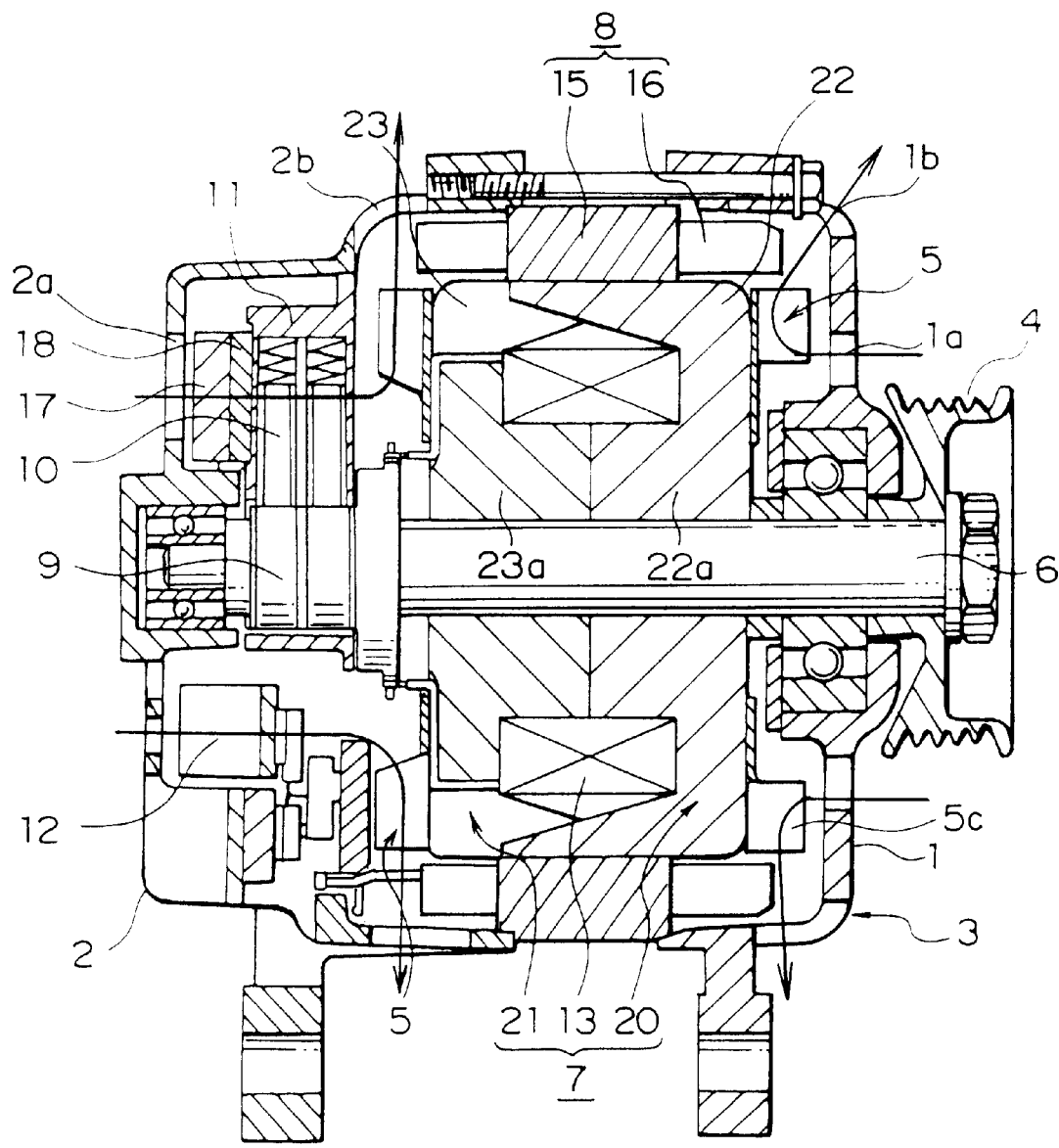
FIG. 24 is a sectional view showing a construction of a conventional, ordinary automotive alternator.
Figure 25:
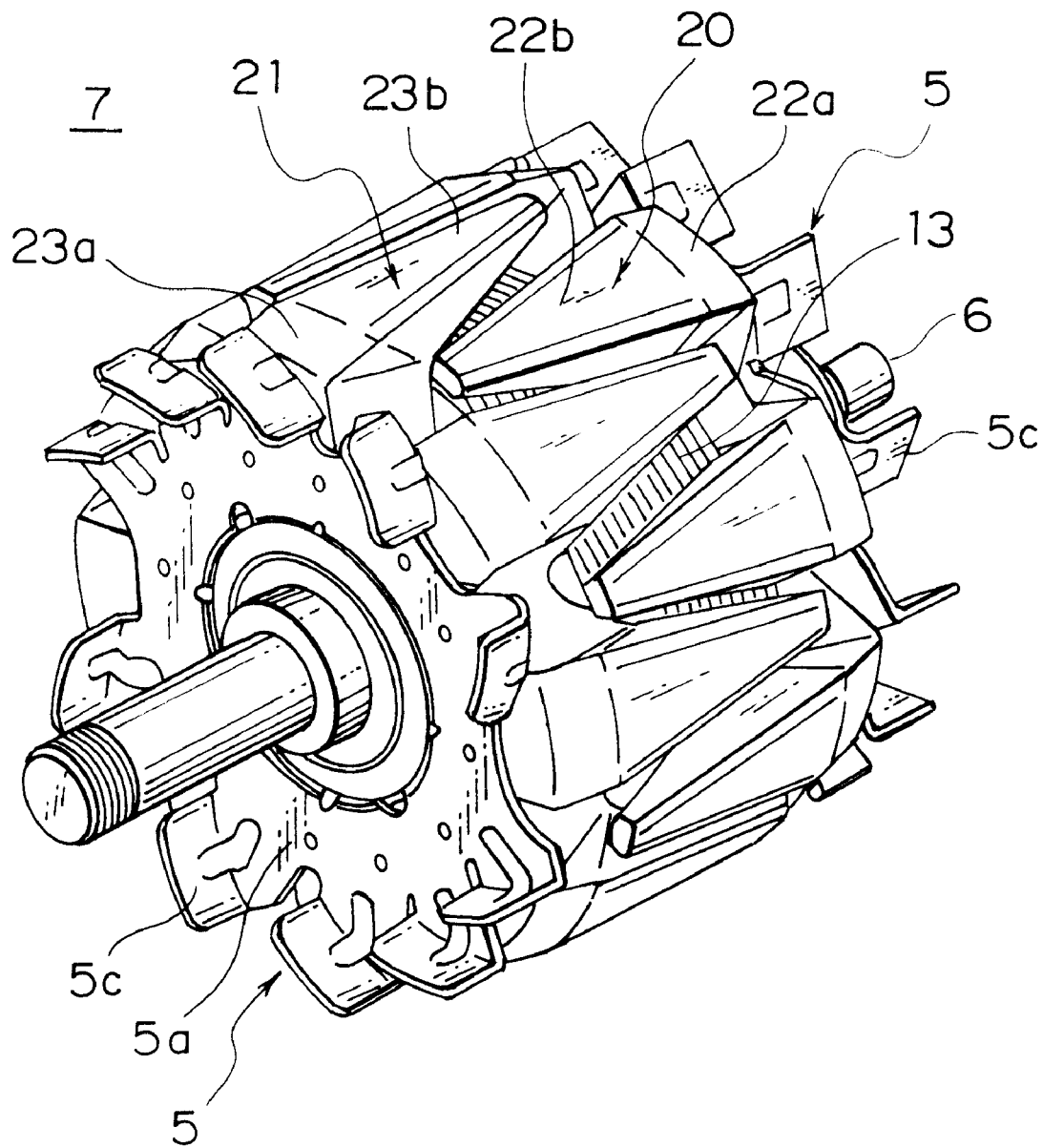
FIG. 25 is a perspective view of a rotor shown in FIG. 24.

FIG. 22 is a plan view of a rotor of the automotive alternator according to a fourth embodiment of the present invention when it is viewed from a front-end; and FIG. 23 is a plan view of the rotor when it is viewed from a rear-end.

In FIG. 22, a front-end fan 705 includes an annular fan base portion 705a and flat blades 705c formed by cutting and raising a plurality of edges extending from the outer circumferential edge section of the fan base portion 705 radially outwardly. The fan 705 has an outside diameter φE.

In contrast, in FIG. 23, a front-end fan 805 includes an annular fan base portion 805a and flat blades 805c formed by cutting and raising a plurality of edges extending from the outer circumferential edge section of the fan base portion 805a radially outwardly. The fan 705 has an outside diameter φF.

In the embodiment, the amount of wind generated by the front-end fan 705 is made larger than the amount of wind generated by the rear-end fan by making the outside diameter φE of the front-end fan 705 larger than the outside diameter φF of the rear-end fan 805. Accordingly, a difference between the amounts of wind can be realized by a simple construction.

In the above respective embodiments, the parts to be cooled such as the rectifiers, the regulator and the like are housed in the rear-end case. However, the present invention is also applicable to a type of an alternator in which parts to be cooled are disposed outside a case and covered with a protection cover or the like so long as the alternator has a rotor and a stator constructed similar to those of the above embodiments.

In each of the above embodiments, copper wire material having a rectangular cross section is used in the strands of wire, but the strands of wire are not limited to copper wire material having a rectangular cross section, and may, for example, be a copper wire material having a circular cross section. In that case, formability of the strands of wire is enhanced, facilitating easy placement and connection of the strands of wire, and improving the workability. Further, the strands of wire are not limited to copper wire material, and may, for example, be an aluminium wire material.

In each of the above embodiments, four strands of wire are arranged so as to line up in a row radially within each slot and the turn portions are arranged to line up in two rows circumferentially, but six strands of wire may be arranged so as to line up in a row radially within each slot and the turn portions are arranged to line up in three rows circumferentially, or eight strands of wire are arranged so as to line up in a row radially within each slot and the turn portions are arranged to line up in four rows circumferentially. Because the more the number of the strands of wire lined up in a row radially within each slot and the number of the turn portions lined up circumferentially increase the more the number of connection portions increase, the present invention can be used for the construction such that a large number of the strands of wire are arranged so as to line up in a row radially within each slot and the turn portions are arranged so as to line up in a large number of rows circumferentially.

In each of the above embodiment, the stator coil have the lengthy wire 30 folded back outside the slots and threaded in the slots through inner layers and outer layers alternately in a depth direction of the slots at every predetermined number of slots, as explained above; the present invention, however, is not limited thereto. As an alternative, a plurality of substantially U-shaped or I-shaped short coil pieces may be inserted from one axial end of the stator core, and coil piece ends projected at the ends of the stator core are connected at every predetermined number of coil pieces thereby to configure a sequential circuit.

In the automotive alternator according to the present invention including the case having the plurality of air intake vents disposed in the axial surface thereof and the plurality of air discharge vents disposed in the radial surface thereof, the rotor having the pair of pole cores including the claw-shaped magnetic poles projecting radially externally from the outer circumferential perimeters thereof at even pitch, respectively, fastened to the shaft such that the claw-shaped magnetic poles intermesh and rotatably disposed in the case, the pair of pole cores having the pair of fans, which include the plurality of blades around the outer circumferences thereof, and being fastened to the axial end surfaces thereof; and the stator fastened to the case so as to cover the outer circumference of the rotor, and having the stator core including the plurality of slots formed around the inner circumference thereof facing the rotor and the stator winding accommodated in the slots, the slots are formed in an even number, each of the claw-shaped magnetic poles is formed in an even number, and the blades of the pair of fans are formed in the same odd number, respectively.

Accordingly, vibration of the claw-shaped magnetic poles themselves which is generated when the rotor rotates is not synchronized with vibration of each of the fans having the blades which are fastened to the claw-shaped magnetic poles and project axially, by which noise can be decreased. Further, the front-end and rear-end blades are not synchronized with the claw-shaped magnetic poles, respectively because the number of the front-end blades is the same as the number of the rear-end blades, by which noise can be more decreased. Furthermore, noises, which are caused by the blades, are prevented from having an individually different frequency forward and rearward of the blades.

The number of the fan blades is less than one-half the number of the pair of claw-shaped magnetic poles. Thus, the smaller number of blades are provided and the area of each blade can be relatively increased, which can improve the cooling capability.

In addition, the parts to be cooled are housed in the rear-end case and the amount of wind generated by the front-end fan is larger than the amount of wind generated by the rear-end fan. Accordingly, the pressure loss of cooling wind at the front-end is made equal to the pressure loss of cooling wind at the rear-end, and the noises generated by the fans being made equal to each other at the front-end and at the rear-end.

The outlet angle of the front-end fan is larger than the outlet angle of the rear-end fan. Therefore, it is possible to make the amount of wind generated by the front-end fan larger than the amount of air generated by the rear-end fan by the simple construction.

The outside diameter of the front-end fan is larger than the outside diameter of the rear-end fan. Accordingly, it is possible to make the amount of wind generated by the front-end fan larger than the amount of air generated by the rear-end fan by the simple construction.

Further, the stator winding includes the plurality of windings in each of which the one strand of wire is bent back outside the slots at the end surfaces of the stator core and wound into the wave winding so as to alternately occupy the inner layer and the outer layer in the slot depth direction within the slots a predetermined number of slots apart, and the strand of wire bent back outside the slots at the end surfaces of the stator core is arranged in the circumferential direction, thereby constituting the coil end groups having approximately the same shape.

Accordingly, a coil end portion, which is arranged neatly over the entire circumference, can be obtained, which reduces a ventilation resistance and improves the cooling property and wind noise.

Further, the stator winding includes the plurality of windings in each of which the one long strand of wire is bent back outside the slots at the end surfaces of the stator core and wound into the wave winding so as to alternately occupy the inner layer and the outer layer in the slot depth direction within the slots a predetermined number of slots apart, and the turned portions of the strand of wire bent back outside the slots at the end surfaces of the stator coil are arranged in the circumferential direction, thereby constituting the coil end groups, and the coil ends having approximately the same shape at the front-end and the rear-end.

Thus, the stator winding interferes with the respective blades in the same degree at the front-end and the rear-end, thereby reducing interference noise.

Further, the number of the slots is set to two in each pole and in each phase. As a result, the number of slots is six times the number of poles in a three-phase alternator so that the frequency of vibration of the fans is apart from the frequency of vibration of the claw-shaped magnetic poles, by which noise can be more dispersed and reduced. In addition, the number of the coils extending from the slots is increased and a noise reduction effect can be increased.

What is claimed is:

1. An automotive alternator including, a case having a plurality of air intake vents disposed in the axial surface thereof and a plurality of air discharge vents disposed in the radial surface thereof, a rotor having a pair of pole cores including claw-shaped magnetic poles projecting radially externally from the outer circumferential perimeters thereof at even pitch, respectively, fastened to a shaft such that said claw-shaped magnetic poles intermesh and rotatably disposed in said case, said pair of pole cores having a pair of fans, which include a plurality of blades around the outer circumferences thereof, and being fastened to the axial end surfaces thereof; and a stator fastened to said case so as to cover the outer circumference of said rotor, and having a stator core including a plurality of slots formed around the inner circumference thereof facing said rotor and a stator winding accommodated in said slots, wherein:

said slots are formed in an even number, said claw-shaped magnetic poles of each pole core are formed in an even number, and said blades of said pair of fans are formed in the same odd number, respectively.

2. An automotive alternator according to claim 1, wherein the number of said fan blades is less than one-half the total number of said pair of claw-shaped magnetic poles.

3. An automotive alternator according to claim 1, wherein parts to be cooled are housed in said case at a rear-end and the amount of wind generated by a fan at a front-end is larger than the amount of wind generated by a fan at said rear-end.

4. An automotive alternator according to claim 3, wherein the outlet angle of said fan at said front-end is larger than the outlet angle of said fan at said rear-end.

5. An automotive alternator according to claim 3, wherein the outside diameter of said front-end fan is larger than the outside diameter of said rear-end fan.

6. An automotive alternator according to claim 1, wherein said stator winding includes a plurality of windings in each of which one strand of wire is bent back outside said slots at the end surfaces of said stator core and wound into wave winding so as to alternately occupy an inner layer and an outer layer in a slot depth direction within said slots a predetermined number of slots apart, and said strand of wire bent back outside said slots at the end surfaces of said stator core is arranged in a circumferential direction, thereby constituting coil end groups having approximately the same shape.

7. An automotive alternator according to claim 1, wherein said stator winding includes a plurality of windings in each of which one long strand of wire is bent back outside said slots at the end surfaces of said stator core and wound into the wave winding so as to alternately occupy an inner layer and an outer layer in a slot depth direction within said slots a predetermined number of slots apart, and the turned portions of said strand of wire bent back outside said slots at the end surfaces of said stator core are arranged in a circumferential direction, thereby constituting coil end groups, said coil ends having approximately the same shape at said front-end and at said rear-end.

8. An automotive alternator according to claim 1, wherein the number of said slots is set to two in each pole and in each phase.

* * * * *